United States Patent [19]

Johansson

[11] 4,175,984
[45] Nov. 27, 1979

[54] METHOD AND A DEVICE FOR INITIATING AN OXYGEN DESEAMING PROCESS

[75] Inventor: Bengt A. Johansson, Gothenburg, Sweden

[73] Assignee: Centro-Maskin Goteborg AB, Gothenburg, Sweden

[21] Appl. No.: 904,411

[22] Filed: May 10, 1978

[30] Foreign Application Priority Data

May 12, 1977 [SE] Sweden ................................ 7705545

[51] Int. Cl.² ............................................... B23K 7/08
[52] U.S. Cl. ..................................... 148/9.5; 148/9 C; 266/75
[58] Field of Search .................. 148/9.5, 9 C; 266/74, 266/75

[56] References Cited

U.S. PATENT DOCUMENTS

| 2,205,890 | 6/1940 | Nicholson et al. | 266/75 |
| 2,291,065 | 7/1942 | Walker | 266/75 |
| 2,309,096 | 1/1943 | Buchnam | 148/9 C |
| 3,933,533 | 1/1976 | Uchida et al. | 266/75 |
| 4,042,225 | 8/1977 | Jones et al. | 266/75 |

Primary Examiner—W. Stallard
Attorney, Agent, or Firm—Darby & Darby

[57] ABSTRACT

A method for starting a gas deseaming of ingots and billets employs a point-shaped heating source. A motion is imparted to said heating source parallel to the orifice of a gas-planing nozzle. An oxidizing gas jet emerging from said nozzle burns away metal melted by said point-shaped heating source. A device for performing this method comprises electric arc generating means including an electrode and guide means capable of guiding the electrode along a path opposite the orifice of a gas-planing nozzle and in parallel relation thereto.

6 Claims, 1 Drawing Figure

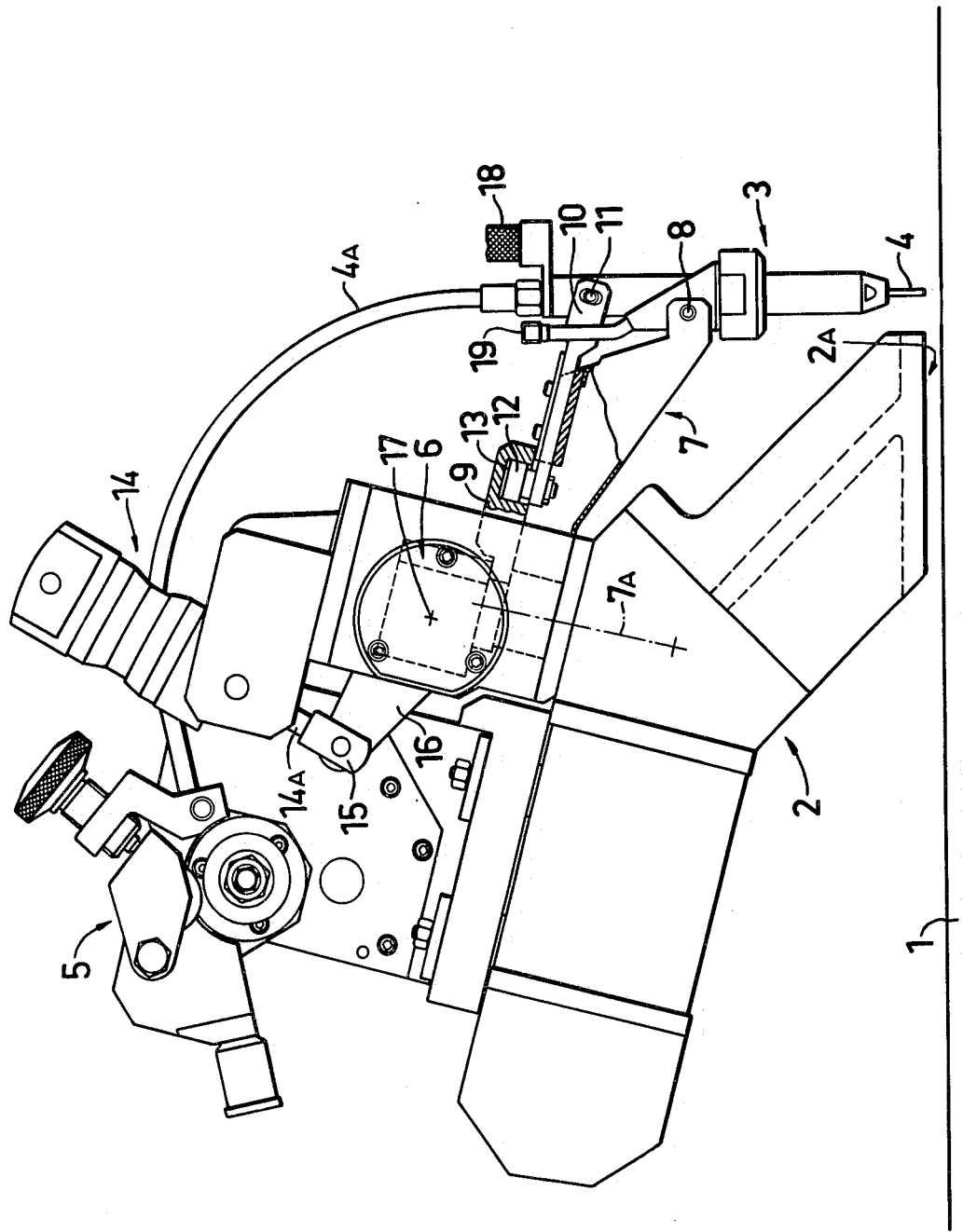

METHOD AND A DEVICE FOR INITIATING AN OXYGEN DESEAMING PROCESS

This invention relates to a method and a device for initiating a gas deseaming process of a type as defined in the preambles of the appended claims 1 and 5.

In gas deseaming of billet surfaces several different solutions have been presented to initiate the working planing. Especially at so-called spot planing it has been considered as necessary to be able to start the working planing without the billet—or the planing burner—being stopped, i.e. to be able to make possible a "flying start".

In that connection auxiliary burners for local melting of the billet surface, possibly by addition of iron powder, or melting by an electric arc by means of a non-meltable electrode, have been used. Also meltable electrodes have been utilized in such a way that melting on one spot or melting in the form of a route transversely to the direction of the planing has taken place immediately before the defect to be removed.

All previous attempts to achieve a flying start in oxygen deseaming has resulted in complicated devices, which are sensitive to outer disturbance to a large extent.

By the present invention a method of initiating an oxygen deseaming process is obtained, which can be carried out in a simple and reliable way by means of the device of the invention.

This is achieved according to the invention by the method and the device being given the characteristic features defined in the claims.

Thus, the method of the invention utilizes a local melting of the surface of the workpiece to initiate the oxygen deseaming process, which preferably utilizes oxygen gas as working medium. The local melting is preferably obtained by the influence of an electric arc, which is formed between the workpiece and an electrode. The electrode can with advantage consist of aluminum or some other easily oxidizable material. In this way the possibility of being able to check the size of the local melting on the surface of the workpiece increases, which melt thus initiates alone the deseaming process nozzle. An electrode tip consisting of e.g. aluminium will be continuously destroyed in the oxidizing atmosphere, but still secures the existence of the electric arc.

In order not to risk extinction—removal of the cathode spot from the electrode tip—the intitiation process preferably takes place with reduced gas flow in the planing nozzle.

By the controlled local melting on the surface of the workpiece the generation of deep so-called start pits is prevented. A soft transition and a shallow working groove are thus obtained at the initial stage of the working planing, which together with a short air flow in the main nozzle, when the working is finished, will provide a working groove that can be easily rolled in a subsequent working of the workpiece.

The local melting of the workpiece will according to the invention take place along a route which is not directed perpendicularly to direction of feed. This does not injuriously actuate the possibility of safety initiating the planing process as it has been possible to increase the motion speed of the point heat source parallelly to the nozzle of the planing means essentially in comparison with previously known processes. Thus, the transverse feeding of the point heat source can take place at a rate that is five times greater than what is possible in previously known processes. This increase of speed also makes possible a flying start of the planing process at a feed speed of the workpiece of up to 25 m/min or even more.

By maintaining the reduced oxygen flow during the whole starting course, i.e. when the contact nose is moved along the orifice of the nozzle and as the real working for removal of a surface defect in the workpiece does not take place until the width of the whole planing groove has formed a working saving material can take place. This results in that the feed speed can be increased without nonpermittedly much material being worked before the actual defect. The local melt route obtained by means of the point local source can thus be given an extension at a considerable angle on the workpiece as seen transversely to the direction of feed.

The invention will now be described in connection with a shown illustrative example, where an electrode is utilized to form an electric arc which is a point heat source and where the FIGURE shows a lateral view of a planing nozzle with a contact nose in active position and where parts are broken out at the curve control of the contact nose.

In the figure the workpiece 1 and the planing nozzle 2 with orifice 2A are shown. The contact nose 3 controls the electrode 4 in a casing 4 A from a feeding device 5. The contact nose 3 is articulatedly attached to an arm 7 at 8, which arm is pivotable by means of a turning cylinder 6. The turning cylinder 6 is of conventional type with piston, piston rod and a rack assembly formed on the piston rod. This rack assembly cooperates with toothed segments attached to the arm 7, it being possible that a turning of the arm 7 can take place by means of the turning cylinder 6 around the shaft 7A. A curve 13 is rigidly arranged at the housing of the turning cylinder 6. The curve 13 is so dimensioned that a curve roll 12 controlled therein and connected to a control arm 10 of a pivot 11 in the contact nose 3 controls the tip of the contact nose 3 in a pathway parallelly in front of the orifice 2A of the planing nozzle, when the arm 7 is being turned.

Contact nose 3, arm 7, control arm 11, curve roll 12, curve 13 and turning cylinder 6 can by actuation from the piston-cylinder arrangement 14 and the piston rod 14A be lifted from active position—by turning around the point 17—via the turning hinge 15 and an arm 16 rigidly connected to the housing of the turning cylinder 6.

At the contact nose 3 also a cable 18 for current supply and a conduit 19 for supply of cooling water are arranged.

The way of operation of the device shown in the figure is as follows. Gas is fed with a reduced flow through the nozzle 2. The piston-cylinder arrangement 14 moves via the piston rod 14 A, the hinge 15 and the arm 16, the contact nose 3, the arm 7, the control arm 10, the curve mechanism 12, 13 and the turning cylinder 6 down to the surface of the workpiece 1. Then the turning cylinder 6 will maintain the arm 7 in an end position. An electrode is fed by means of the feeding device 5. In that connection an electric arc between the tip of the electrode 4 and workpiece 1 will arise, the electric arc creating a local melting of the surface of the workpiece. At the same time transverse feeding is started by the contact nose 3 by activation of the turning cylinder 6. The electric arc is maintained by feeding of electrode 4, which preferably consists of aluminium. After the contact nose 3 being moved right across the orifice of the nozzle 2 parallelly to this to the other end position, gas is fed with a maximum flow through the nozzle 2 at the same time as the contact nose 3 with fittings is lifted by means of the piston-cylinder device 14. The electrode feeding ceases and the real working planing is started with a maximum working depth.

When finishing the working planing the gas flow in the nozzle is preferably replaced with a short air flow, an advantageous finish being formed on the planing groove.

The planing nozzle has been shown schematically in the illustrative example. A planing nozzle with side nozzles and evacuation nozzles as described in th Swedish patent application 7608208-0 can preferably be used.

If a non-destroyable or a meltable electrode is used for initiation of the planing process, a preheating of the electrode tip can take place before it is moved to active position through the contact nose, or else the electrode tip can be given a "scratching" motion along the billet surface to prevent the electrode tip from sticking to the workpiece and burning off in a position above the workpiece, which might cause an interruption of the continuous initiation of the planing groove.

The gas flowing through the planing nozzle preferably consists of pure oxygen gas.

What I claim is:

1. A method for initiating a gas deseaming process on a workpiece by melting of the surface of the workpiece to ignition temperature by means of a point heat source, characterized in that the point heat source is given a motion parallel to the orifice of the planing nozzle in direct connection to this, oxidizing gas simultaneously flowing through the planing nozzle.

2. The method as claimed in claim 1, characterized in that the point heat source consists of an electric arc generated between the workpiece and an electrode.

3. The method as claimed in claim 2, characterized in that the electrode is preheated in an inactive position before the motion parallelly to the orifice of the planing nozzle is started.

4. The method as claimed in claim 2, characterized in that the electrode tip is moved towards the surface of the workpiece at the same time as the tip is given a motion parallelly to the surface of the workpiece.

5. A device for initiating an oxygen deseaming process on a workpiece by melting of the surface of the workpiece to ignition temperatures by means of a point heat source and for carrying out the method of claim 1, characterized in that the point heat source consists of an electric arc generated between an electrode and the workpiece, the wire being controlled in a contact nose articulatedly arranged on a pivot arm, which moves the contact nose parallelly in front of the orifice of the planing nozzle by the influence of a turning cylinder and a curve guide.

6. The device as claimed in claim 5, characterized in that the curve guide consists of a stationarily arranged curve and a curve roll engageing therein and arranged at a control arm, which is axially displaceable and articulately attached at the contact nose, the curve being so constituted that the control arm at the turning of the contact nose will maintain the tip of the contact nose parallel to the orifice of the planing nozzle via the curve roll.

* * * * *

Notice of Adverse Decision in Interference

In Interference No. 101,241, involving Patent No. 4,175,984, B. A. Johansson, METHOD AND A DEVICE FOR INITIATING AN OXYGEN DESEAMING PROCESS, final judgment adverse to the patentees was rendered July 2, 1985, as to claim 1.

[*Official Gazette November 19, 1985.*]